United States Patent [19]

Allen

[11] 4,345,703

[45] Aug. 24, 1982

[54] CARRYING BAG, PARTICULARLY FOR BICYCLES

[76] Inventor: Richard A. Allen, Bowles Ter., Lincoln, Mass. 01773

[21] Appl. No.: 234,773

[22] Filed: Feb. 17, 1981

[51] Int. Cl.³ .............................................. B62J 9/00
[52] U.S. Cl. ..................................... 224/32 A; 224/39
[58] Field of Search ............... 224/32 R, 32 A, 33 R, 224/35, 39, 40

[56] References Cited

U.S. PATENT DOCUMENTS 4,258,870 3/1981 Edelson ............................ 224/39 X
4,262,829 4/1981 Hine, Jr. et al. .................. 224/32 R

FOREIGN PATENT DOCUMENTS 79236 6/1948 Norway ............................... 224/39

OTHER PUBLICATIONS

Trek Pak, Pak Foam Products, 7/8/75.

Primary Examiner—Steven M. Pollard
Attorney, Agent, or Firm—Herbert L. Bello

[57] ABSTRACT

A collapsable carrier configured to be mounted on a bicycle includes a carrying bag that is fitted to a foldable frame having a pair of pivotable members. The bag has a contiguous carrying chamber with an upper compartment that occupies the space above the wheel of the bicycle and a pair of lower compartments that are positioned on opposite sides of the wheel. The frame defines both a support for holding the bag to form the upper compartment and outriggers for keeping the lower compartments away from the spokes. Fasteners are provided for securing the carrier to the bicycle.

11 Claims, 4 Drawing Figures

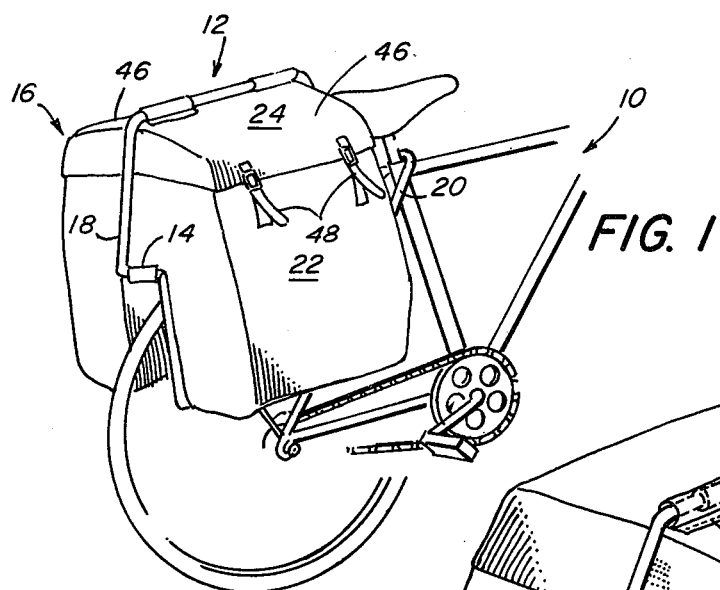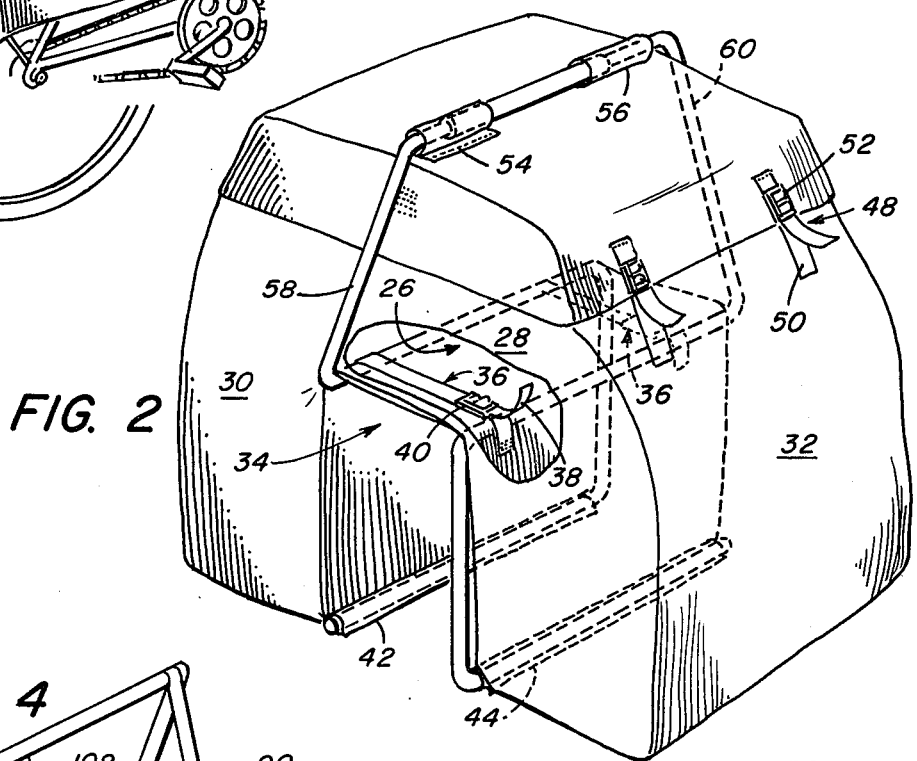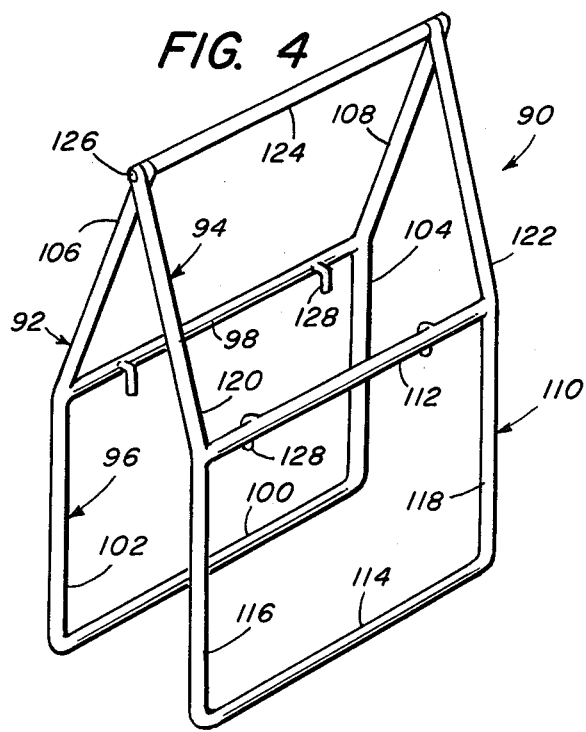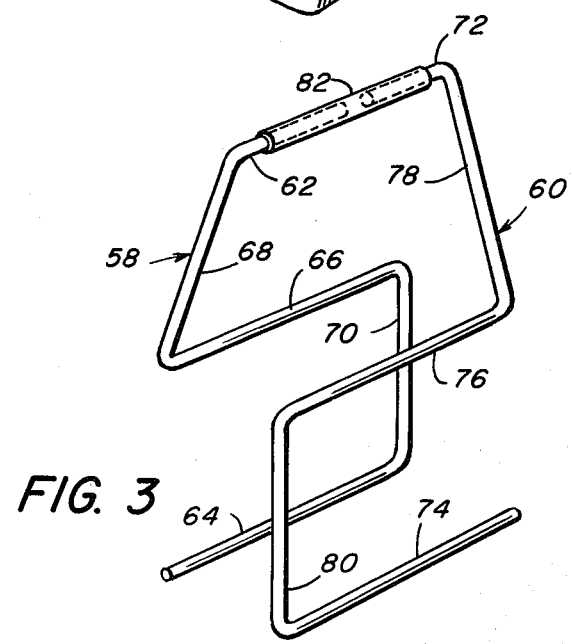

CARRYING BAG, PARTICULARLY FOR BICYCLES

BACKGROUND OF THE INVENTION

1. Field of the Invention

The present invention relates to carriers for goods and, more particularly, is directed towards such carriers that are configured to be mounted on bicycles.

2. Description of the Prior Art

The high cost of fuel has made traveling by automobile relatively expensive Consequently, people have turned to alternative forms of transportation that are economical, for example bicycles. In the past, bicycles were used primarily for recreation. Today, bicycles are being used for shopping. However, due to the limited carrying capacity of bicycle mountable carriers, bicycles have not been used to any great extent for shopping or other chores that require the carrying of goods.

SUMMARY OF THE INVENTION

An object of the present invention is to provide a carrier with increased carrying capacity that is mountable on a bicycle.

Another object of the invention is to provide a collapsable carrier with increased carrying capacity that is configured to be mountable on a bicycle and utilize the space above and beside the bicycle wheel. The carrier is characterized by a fabric carrying bag that is fitted to a foldable frame having a pair of pivotable members. The carrying bag includes a contiguous chamber with an upper compartment and a pair of side compartments, the upper compartment being positioned over the wheel of the bicycle and each side compartment being disposed at one side of the wheel. The frame includes upper arms that support the upper compartment in an upright position, lower feet that hold the side compartments away from the spokes, and intermediate legs that mount the frame to the bicycle. Fasteners are provided for securing the carrier to the bicycle.

Other objects of the present invention will in part be obvious and will in part appear hereinafter.

The invention accordingly comprises the devices, together with their parts, elements and interrelationships, that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in conjunction with the accompanying drawings, wherein:

FIG. 1 is a perspective view of a carrier embodying the present invention that is mounted to a bicycle;

FIG. 2 is a perspective view of the carrier of FIG. 1 showing details of the frame and bag;

FIG. 3 is a perspective view of the frame of FIG. 2; and

FIG. 4 is a perspective view of an alternate embodiment of the frame of FIG. 3.

DESCRIPTION OF THE PREFERRED EMBODIMENTS

Referring now to the drawings, particularly FIG. 1, there is shown a bicycle 10 with a collapsible carrier 12 embodying the present invention secured to a rear carrier 14 which is mounted to bicycle 10. Carrier 12, shown in its expanded position in FIGS. 1 and 2, includes a carrying bag 16 and a foldable frame 18 (FIG. 3). A fastener 20, for example a strap, is provided for holding carrier 12 on bicycle 10.

As hereinafter described, carrying bag 16 comprises a body 22 and a hood 24. Body 22, which is composed of a water repellent relatively flexible material such as a polyamide resinous material, for example, has a contiguous carrying chamber 26 having an upper compartment 28 and a pair of side compartments 30, 32. Carrying bag 16 has a generally U-shaped configuration in end view and a substantially rectangular profile in side view. The inside walls of side compartments 30, 32 and the lower wall of upper compartment 28 form an arch-like structure 34. A pair of transversely disposed fasteners 36 are attached on the interior side of the intrados of arch-like structure 34. In the illustrated embodiment, by way of example, each fastener 36 includes a strap 38 and a catch 40. A pair of sleeves 42 and 44 are sewn at the lower margins of the inside walls of compartments 30 and 32, respectively.

Hood 24, which is composed of the same material as body 22, is provided for covering chamber 26. A central location at each end of hood 24 is sewn to an upper central area at each end of body 22, whereby the hood is divided into a pair of flaps 46 which provide individual access to upper compartment 28 and side compartments 30 and 32. In the illustrated embodiment, a plurality of fasteners 48 are provided on the sides of body 22 and hood 24 for securing the hood in its closed position as shown in FIG. 2. In one example, each fastener 48 includes a strap 50 and a catch 52. A pair of sleeves 54 and 56 are sewn to the top of hood 24 along the longitudinal axis of carrier 12, the sleeves being in axial alignment. Sleeves 42, 44 on body 22 and sleeves 54, 56 on hood 24 are configured to slidably receive frame 18, the sleeves being composed of the same material as body 22.

As best shown in FIGS. 2 and 3, frame 18 includes a pair of pivotable members 58 and 60, each pivotable member having a substantially S-shaped profile. In the illustrated embodiment, by way of example, each member 58 and 60 is a hollow tubular member composed of steel. Tubular member 58 includes an upper arm 62, a lower foot 64 and an intermediate leg 66. One end of arm 62 is connected to one end of leg 66 by an inwardly sloping vertical member 68, the other end of leg 66 and one end of foot 64 being connected by a vertical member 70. Foot 64 and leg 66 are disposed in a substantially vertical plane, arm 62 is disposed inwardly of leg 66 and foot 64. Foot 64 and leg 66 are approximately equal in length, while arm 62 is approximately ½ the length of leg 66. In the illustrated embodiment, by way of example, arm 62 is six inches, foot 64 and leg 66 are approximately twelve inches, vertical member 68 is approximately twelve inches and vertical member 70 is approximately seven inches. Vertical member 68 is turned inwardly approximately 10° from the vertical plane of member 70 at its end adjacent intermediate leg 66. Member 60 includes an upper arm 72, a lower foot 74 and an intermediate leg 76. An inwardly sloping vertical member 78 is connected between one end of arm 72 and one end of leg 76. A substantially vertical member 80 connects the other end of leg 76 and one end of foot 74. Member 60 is identical to member 58 in construction. A sleeve 82 composed of steel, for example, is configured to receive arms 62 and 72, members 58 and 60 being pivotable relative to one another in sleeve 82.

In the assembly of carrier 12, sleeve 82 is positioned in sleeves 54 and 56. Then, upper arm 62 is inserted into sleeves 54 and 82 in a first direction and upper arm 72 is inserted into sleeves 56 and 82 from the opposite direction. Next, sleeve 42 is pushed onto foot 64 and sleeve 44 is pushed onto foot 74. As best shown in FIG. 2, when feet 64 and 74 are received in sleeves 42 and 44, respectively, intermediate legs 66 and 76 are pressed against the upper inside walls of side compartments 30, 32. The ends of feet 64 and 70 are at opposite ends of body 22 and the ends of arms 62 and 72 face each other. Furthermore, the ends of arm 62 and foot 64 face opposite ends of carrier 12. Similarly, the ends of foot 74 and arm 72 face opposite ends of carrier 12. Once carrying bag 16 is fitted onto frame 18, the entire assembly is put onto rear carrier 14. Next, fasteners 36, which are secured to the walls of side compartments 30 and 32 below the contact point of intermediate legs 66 and 76, are tightened, whereby the intermediate legs are pressed against rear carrier 14. Finally, strap 20 is placed about the seat post for holding carrier 12 on bicycle 10. Upper arms 62, 72 and sleeve 82 define an upper support for holding carrier 12 in an upright position. Lower feet 64 and 74 define outriggers which are operative to keep side compartments 30 and 32 away from the spokes of the bicycle wheel. It will be readily appreciated that carrier 12 is readily collapsable due to the pivoting action of members 58 and 60 when removed from bicycle 10. In addition, carrier 12 is freestanding and rests on lower feet 64 and 74 when removed from bicycle 10 as evidenced in FIG. 2. When carrier 12 is positioned on bicycle 10, upper compartment 28 is positioned over the bicycle wheel and side compartments 30, 32 are positioned on either side of the wheel. Although carrier 12 is shown mounted at the rear of bicycle 10, the carrier can be mounted on the front of the bicycle.

Referring now to FIG. 4, there is shown a frame 90 which is an alternate embodiment of frame 18. Frame 90, which is comprised of a plurality of steel tubular sections, includes a pair of pivotal members 92 and 94. Member 92 includes a substantially rectangular frame 96 having a pair of horizontal members 98, 100 and a pair of vertical members 102, 104. Frame 96 lies in a substantially vertical plane. Extending upwardly and inwardly from the ends of horizontal member 98 are uprights 106 and 108. Uprights 106 and 108 slope inwardly approximately 10° from the vertical plane of frame 96. Member 94 includes a substantially rectangular frame 110 having a pair of horizontal members 112, 114 and a pair of vertical members 116, 118. Frame 110 lies in a substantially vertical plane. A pair of uprights 120 and 122 slope inwardly from opposite ends of horizontal member 112 at an angle of approximately 10° from the vertical plane of frame 110. The ends of upright 106, 120 and 108, 122 are pivotably attached to a cross member 124 by fasteners 126. In this embodiment, the carrying bag is provided with substantially vertical sleeves which are adapted to receive uprights 106, 108, 120 and 122. Frame 90 is attached to the bicycle by means of clips 128 that are fastened to members 98 and 112. In an alternate embodiment of frame 90, each rectangular frame 96 and 110 is formed from a rectangular plate.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A carrier configured to be mounted on a bicycle, said carrier comprising:
   (a) a foldable frame having an upper member and a pair of side members;
   (b) a bag fitted to said frame, said bag having an upper compartment and a pair of side compartments; and
   (c) means for holding said frame and said bag to the bicycle, said frame operative to hold said upper compartment over a wheel of the bicycle and each of said side compartments at each side of the wheel when said carrying bag is mounted to said bicycle;
   (d) said frame including a pair of pivotable members, each said pivotable member having an upper support and a lower outrigger, said upper supports operative to hold said bag upright to maintain said upper compartment in an expanded position above the wheel, said outriggers operative to keep side compartments away from the spokes of the wheel.

2. The carrier as claimed in claim 1 wherein each of said pivotable members has a substantially S-shaped profile in right cross-section.

3. The carrier as claimed in claim 2 wherein each of said upper support members and outriggers are substantially parallel to one another.

4. The carrier as claimed in claim 2 wherein each said pivotable member includes an upper arm, an intermediate leg and a lower foot, said upper arm of each said pivotable member defining said upper support, said lower foot of each said pivotable member defining one of said outriggers, said intermediate legs cooperating with one another to hold said carrier on said bicycle, said legs and feet of each said member in a first plane, said upper arms of each said member in a second plane that is angularly offset from said first plane.

5. The carrier as claimed in claim 4 wherein each said pivotable member includes a pair of substantially vertical members, said upper arm, intermediate leg and lower feet of each said pivotable member being substantially horizontal members, one of said vertical members connecting one end of said upper arm and one end of said intermediate leg, the other of said vertical members connecting the other end of said intermediate leg and one end of said lower foot, said one vertical member in said second plane and said other vertical member in said first plane.

6. The carrier as claimed in claim 4 wherein said bag is provided with a first pair of sleeves at the upper end thereof and a second pair of sleeves at the lower end thereof, said first pair of sleeves in axial alignment, said second pair of sleeves in spaced parallel relationship.

7. The carrier as claimed in claim 6 wherein said upper arms are slidably received in said first pair of sleeves and one of each said lower feet is slidably received in one of each said lower sleeves, said lower foot inserted into said lower sleeve in a direction that is opposite to the direction in which said upper arm of the same pivotable member is inserted into said upper sleeve, the other end of said upper arm and the other end of said lower foot at opposite ends of said bag.

8. The carrier as claimed in claim 7 wherein said bag is formed with an arch that separates said side compartments, the intrados of said arch resting on said intermediate legs.

9. The carrier as claimed in claim 8 including strap means transversely affixed to an interior of said bag, said strap means operative to pull said intermediate legs towards one another for clamping said carrier to the bicycle.

10. A carrier configured to be mounted on a bicycle, said carrier comprising:
(a) a frame having an upper member and a pair of side members;
(b) a bag fitted to said frame, said bag having an upper compartment and a pair of side compartments,
(c) means for holding said frame and said bag to the bicycle, said frame operative to hold said upper compartment in an expanded position over a wheel of the bicycle and each of said side compartments at each side of the wheel when said carrying bag is mounted to said bicycle.

11. The carrier as claimed in claim 10 wherein said frame includes a pair of pivotably connected support means and cross means, each said support means having first and second uprights and a substantially rectangular body, said first and second uprights extending upwardly and inwardly from an upper portion of said rectangular body, said first upright of each said support means pivotably connected to one end of said cross means, said second upright of each said support means pivotably connected to the other end of said cross means, said first and second uprights operative to hold said bag upright to maintain said upper compartment in an expanded position above the wheel.

* * * * *